(12) United States Patent
Inagaki et al.

(10) Patent No.: US 11,787,321 B2
(45) Date of Patent: *Oct. 17, 2023

(54) VEHICLE SEAT

(71) Applicant: HONDA MOTOR CO., LTD., Tokyo (JP)

(72) Inventors: Tohru Inagaki, Tokyo (JP); Takumi Sato, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 19 days.

This patent is subject to a terminal disclaimer.

(21) Appl. No.: 17/582,030

(22) Filed: Jan. 24, 2022

(65) Prior Publication Data
US 2022/0242291 A1 Aug. 4, 2022

(30) Foreign Application Priority Data

Jan. 29, 2021 (JP) ................. 2021-013273

(51) Int. Cl.
A47C 7/62 (2006.01)
B60N 2/90 (2018.01)
B60R 16/03 (2006.01)

(52) U.S. Cl.
CPC ............... *B60N 2/90* (2018.02); *B60R 16/03* (2013.01)

(58) Field of Classification Search
CPC ............................ B64D 11/0624; B64D 11/06
See application file for complete search history.

(56) References Cited

U.S. PATENT DOCUMENTS

| 4,792,881 A | * | 12/1988 | Wilson | A47B 21/06 439/131 |
| 5,122,069 A | * | 6/1992 | Brownlie | H02G 3/185 174/53 |
| 5,575,668 A | * | 11/1996 | Timmerman | A47B 21/06 439/131 |

(Continued)

FOREIGN PATENT DOCUMENTS

| CN | 103359016 | 10/2013 |
| CN | 205273370 | 6/2016 |

(Continued)

OTHER PUBLICATIONS

Japanese Notice of Allowance for Japanese Patent Application No. 2021-013273 dated Feb. 28, 2023.

(Continued)

*Primary Examiner* — Shin H Kim
(74) *Attorney, Agent, or Firm* — AMIN, TUROCY & WATSON, LLP

(57) ABSTRACT

The vehicle seat includes a seat back 2 having a support surface 11, a recessed portion 28 that is provided on a back surface 12 of the seat back 2 opposite to the support surface 11 and formed to be recessed from the back surface 12 toward the inside of the seat back 2, and a socket 7 provided inside the recessed portion 28, to which an external device is connected, and which is provided on a surface inclined to face upward with respect to the back surface 12 of the seat back 2. The back surface 12 of the seat back 2 is provided with a socket housing 6 that is attached to a skin 13 of the seat back 2 and is formed to be recessed toward the inside of the seat back 2. A space inside the socket housing 6 is the recessed portion 28.

4 Claims, 5 Drawing Sheets

(56) References Cited

U.S. PATENT DOCUMENTS

| | | | | |
|---|---|---|---|---|
| 5,980,279 | A * | 11/1999 | Muller | A47B 21/06 |
| | | | | 439/142 |
| D640,654 | S * | 6/2011 | Montag | D14/129 |
| D666,556 | S * | 9/2012 | Byrne | D13/139.4 |
| D669,874 | S * | 10/2012 | Margis | D14/129 |
| 8,287,292 | B2 * | 10/2012 | Byrne | H02G 3/185 |
| | | | | 439/535 |
| 8,295,036 | B2 * | 10/2012 | Byrne | H01R 25/003 |
| | | | | 174/67 |
| D685,329 | S * | 7/2013 | Byrne | D13/139.4 |
| 8,613,385 | B1 * | 12/2013 | Hulet | B64D 11/0015 |
| | | | | 235/375 |
| 8,740,301 | B2 * | 6/2014 | Liu | B60N 2/879 |
| | | | | 297/217.3 |
| 8,929,082 | B2 * | 1/2015 | Mondragon | B64D 11/00153 |
| | | | | 361/728 |
| 8,951,054 | B2 * | 2/2015 | Byrne | H01R 35/04 |
| | | | | 362/127 |
| 9,016,627 | B2 * | 4/2015 | Margis | B64D 11/0015 |
| | | | | 244/118.6 |
| D753,077 | S * | 4/2016 | Margis | D14/129 |
| 9,614,336 | B2 * | 4/2017 | Los | H01R 13/44 |
| 9,941,637 | B2 * | 4/2018 | Nakao | B64D 11/0624 |
| 10,011,357 | B2 * | 7/2018 | Margis | B60R 11/0229 |
| 10,029,793 | B2 * | 7/2018 | Pozzi | B64D 11/0605 |
| 10,116,106 | B2 * | 10/2018 | Byrne | A47C 21/003 |
| 10,673,191 | B2 * | 6/2020 | Byrne | H02J 7/0044 |
| 10,849,431 | B2 * | 12/2020 | Cheng | H01R 27/02 |
| 11,406,194 | B2 * | 8/2022 | Kanazawa | B64D 11/0624 |
| 2006/0052144 | A1 * | 3/2006 | Seil | H04B 1/3822 |
| | | | | 455/90.3 |
| 2007/0182363 | A1 | 8/2007 | Yang | |
| 2009/0013357 | A1 * | 1/2009 | Cassellia | B60R 11/0235 |
| | | | | 725/75 |
| 2011/0174926 | A1 | 7/2011 | Margis et al. | |
| 2012/0039048 | A1 * | 2/2012 | Mondragon | B64D 11/0015 |
| | | | | 361/733 |
| 2012/0200989 | A1 * | 8/2012 | Byrne | H01R 13/447 |
| | | | | 361/641 |
| 2013/0264851 | A1 | 10/2013 | Kim et al. | |
| 2015/0296633 | A1 * | 10/2015 | Murata | H05K 5/0217 |
| | | | | 361/679.01 |
| 2016/0249073 | A1 * | 8/2016 | Margis | B64D 11/0638 |
| 2016/0355263 | A1 | 12/2016 | Pozzi et al. | |
| 2017/0290176 | A1 * | 10/2017 | Fujimoto | B64D 11/00151 |
| 2017/0369020 | A1 * | 12/2017 | Hiraiwa | B60R 21/207 |
| 2018/0006402 | A1 * | 1/2018 | Nakao | B64D 11/0015 |
| 2019/0054864 | A1 | 2/2019 | Gonzalez et al. | |
| 2019/0300198 | A1 * | 10/2019 | Pozzi | B64D 11/06 |
| 2019/0308728 | A1 * | 10/2019 | McKee | B64D 11/003 |
| 2019/0328141 | A1 * | 10/2019 | Cheng | A47C 7/72 |
| 2020/0094968 | A1 * | 3/2020 | Sloboda | H01R 13/506 |
| 2020/0352341 | A1 * | 11/2020 | Kanazawa | A47C 7/723 |
| 2022/0242290 | A1 * | 8/2022 | Inagaki | B60N 2/90 |
| 2022/0242291 | A1 * | 8/2022 | Inagaki | B60N 2/90 |
| 2022/0410833 | A1 * | 12/2022 | Ukita | B60R 21/207 |
| 2023/0039693 | A1 * | 2/2023 | Dessapt | B60R 11/0229 |

FOREIGN PATENT DOCUMENTS

| | | |
|---|---|---|
| CN | 109398195 | 3/2019 |
| EP | 1974990 | 10/2008 |
| JP | 2012-183856 | 9/2012 |
| JP | 2013-506596 | 2/2013 |
| JP | 2013-216162 | 10/2013 |
| JP | 2015-157543 | 9/2015 |
| JP | 2016-182905 | 10/2016 |
| JP | 2018-090144 | 6/2018 |

OTHER PUBLICATIONS

Japanese Office Action for Japanese Patent Application No. 2021-013273 dated Sep. 20, 2022.

Japanese Notice of Allowance for Japanese Patent Application No. 2021-013272 dated Sep. 27, 2022.

Chinese Office Action for Chinese Patent Application No. 202111587648.X dated Apr. 20, 2023.

* cited by examiner

VEHICLE SEAT

CROSS-REFERENCE TO RELATED APPLICATION

Priority is claimed on Japanese Patent Application No. 2021-013273, filed Jan. 29, 2021, the content of which is incorporated herein by reference.

BACKGROUND OF THE INVENTION

Field of the Invention

The present invention relates to a vehicle seat.

Description of Related Art

Conventionally, a configuration in which a socket such as a USB socket is provided on a back surface of a seat back to be used by an occupant on a rear seat of vehicle seats is known for vehicle seats used for vehicles such as automobiles. In these vehicle seats, various techniques for improving convenience and comfort for an occupant have been proposed.

For example, Patent Document 1 (Japanese Unexamined Patent Application, First Publication No. 2018-90144) discloses a configuration of a vehicle seat which has a back pad housed inside a seat back, a bulging portion that bulges from the seat back to a rear seat side, and an elongated socket that is provided in the bulging portion and extends in a front to rear direction of the seat. The socket is disposed inside a space portion formed between the bulging portion and the back pad such that it does not abut the back pad. According to the technique described in Patent Document 1, the socket is placed not to abut the back pad, and thus, even in a case in which a socket is attached to a back surface of a seat back corresponding to a seating surface of the seat back to which a seated occupant's body abuts, it is possible to prevent the seated occupant from feeling discomfort due to the back pad.

SUMMARY OF THE INVENTION

However, in the technique described in Patent Document 1, convenience or comfort for the occupant who sits on the rear seat and uses the socket has not been considered. For this reason, improving the convenience and comfort with regard to the socket for an occupant who uses the socket has been a problem in this conventional technique.

Therefore, an object of the present invention is to provide a vehicle seat in which convenience and comfort with regard to a socket for an occupant who uses the socket can be improved.

In order to solve the above problems, the vehicle seat according to the present invention has the following configuration.

(1) A vehicle seat according to an aspect of the present invention includes a seat back including a support surface that supports an occupant's back, a recessed portion that is provided on a back surface of the seat back opposite to the support surface and formed to be recessed from the back surface toward the inside of the seat back, and a socket provided inside the recessed portion, to which an external device is connected, and which is provided to face the back surface of the seat back in an inclined direction.

(2) In the vehicle seat according to the above aspect (1), the socket may be provided on a surface inclined to face either upward or downward with respect to the back surface.

(3) In the vehicle seat according to the above aspect (1) or (2), a socket cover that rotates around a rotation axis between a closed state in which the socket is covered and an open state in which the socket is exposed may be provided, a first end portion of the socket cover on which the rotation axis is provided may be provided further inside the seat back with respect to a second end portion located on a side opposite to the rotation axis, and the socket cover may be provided inside the recessed portion and may be located further inside the seat back with respect to an opening surface of the recessed portion.

(4) In the vehicle seat according to any one of the above (1) to (3), a storage pocket provided on the back surface of the seat back may be provided, the socket may be provided on a surface inclined to face upward with respect to the back surface, the storage pocket and the recessed portion may be provided at positions at which they partially overlap each other in a vertical direction, and an upper end portion of the recessed portion may be located above an upper end portion of the storage pocket.

(5) In the vehicle seat according to any one of the above (1) to (4), a socket housing which is formed to be recessed from the back surface of the seat back to the inside of the seat back and which is attached to a skin of the seat back to surround the socket may be provided, and a space inside the socket housing may be the recessed portion.

According to the aspect (1), the back surface of the seat back is provided with the recessed portion recessed toward the inside of the seat back. The socket is provided inside the recessed portion. By connecting an external device to the socket, an occupant on a rear seat can appropriately use an electronic device or the like. The socket is provided to face the back surface of the seat back in an inclined direction. For this reason, in a case in which the occupant on the rear seat connects an external device to the socket, the external device protrudes obliquely with respect to the back surface of the seat back. Thus, as compared with conventional techniques in which an external device is connected substantially perpendicular to the back surface, an amount of rearward protrusion of the external device can be reduced. Accordingly, when an external device is connected to the socket, it becoming an obstacle to an occupant sitting on a rear seat can be inhibited and a large space behind the seat back can be secured. Accordingly, convenience and comfort for the occupant sitting on the rear seat can be improved.

Since the socket is provided inside the recessed portion, the amount of protrusion of the external device can be reduced as compared with the case in which the socket is provided to protrude from the back surface or is provided to be flush with the back surface. Further, since the socket is provided inside the recessed portion, it is easier to protect the socket from an external impact or the like as compared with the case in which the socket is provided to protrude from the back surface. Thus, it is possible to inhibit the socket from directly abutting the rear seat or the like even in a case in which the seat back comes into contact with the rear seat or the like during reclining, for example. Accordingly, the socket can be reliably protected. Similarly, since a part of the external device connected to the socket is also housed in the recessed portion, a cable of the external device, a connection port, and the like can be protected, for example. Further, it becomes less likely for the socket and the external device connected to the socket to come into contact with the occupant on the rear seat during reclining. Accordingly, comfort for the occupant on the rear seat can be improved.

Accordingly, it is possible to provide a vehicle seat in which convenience and comfort with regard to the socket for the occupant who uses the socket can be improved.

According to the aspect (2), the socket is provided on the surface inclined to face upward or downward with respect to the back surface. Thus, when an external device is connected to the socket, the external device protrudes obliquely upward or downward with respect to the back surface of the seat back. Accordingly, it is possible to reduce the amount of protrusion of the external device from the back surface and to make the arrangement convenient for the occupant sitting directly behind the seat back.

According to the aspect (3), the vehicle seat has the rotatable socket cover. Accordingly, for example, the socket can be appropriately protected by closing the socket cover when the socket is not in use. The rotation axis of the socket cover is provided further inside the seat back with respect to the second end portion. Thus, the socket cover can be opened and closed from behind (operable from a side to the rear) around the rotation axis. Accordingly, it is possible to form the socket cover convenient for the occupant sitting on the rear seat located behind the seat back.

The socket cover is provided inside the recessed portion and is located further inside the seat back with respect to the opening surface of the recessed portion. Thus, it is possible to inhibit the socket cover from directly abutting the rear seat or the like even in a case in which the seat back comes into contact with the rear seat or the like during reclining, for example. In particular, since the first end portion of the socket cover is located further inside the seat back with respect to the second end portion, the second end portion is located further inside the seat with respect to the opening surface even in a state in which the socket cover is fully open. This makes it possible to reliably protect the socket cover when the occupant moves behind the vehicle seat or reclines.

According to the aspect (4), the storage pocket is provided on the back surface of the seat back. The socket is provided to face upward with respect to the back surface. The storage pocket and the recessed portion are provided at positions at which they partially overlap each other in the vertical direction, and the upper end portion of the recessed portion is located above the upper end portion of the storage pocket. By disposed them in this way, for example, an electronic device connected to the socket via an external device can be easily housed in the storage pocket while the external device is connected to the socket, for example. Accordingly, it is possible to make a highly convenient arrangement in consideration of a situation when the occupant uses the socket.

According to the aspect (5), the socket housing is formed to be recessed from the back surface of the seat back to the inside of the seat back and is attached to the skin of the seat back to surround the socket. The space inside the socket housing is the recessed portion. Accordingly, by providing the socket housing, it is possible to appropriately provide the recessed portion on the back surface of the seat back with a simple configuration. Since the socket is surrounded by the socket housing, the socket can be protected by the socket housing. The socket housing is attached to the skin of the seat back, and thus even in the case in which the seat back comes into contact with the rear seat or the like during reclining, it is possible to release an impact to the entire seat via the socket housing. As a result, the socket housing and the socket can be protected from the impact.

DETAILED DESCRIPTION OF THE INVENTION

Figure 1:
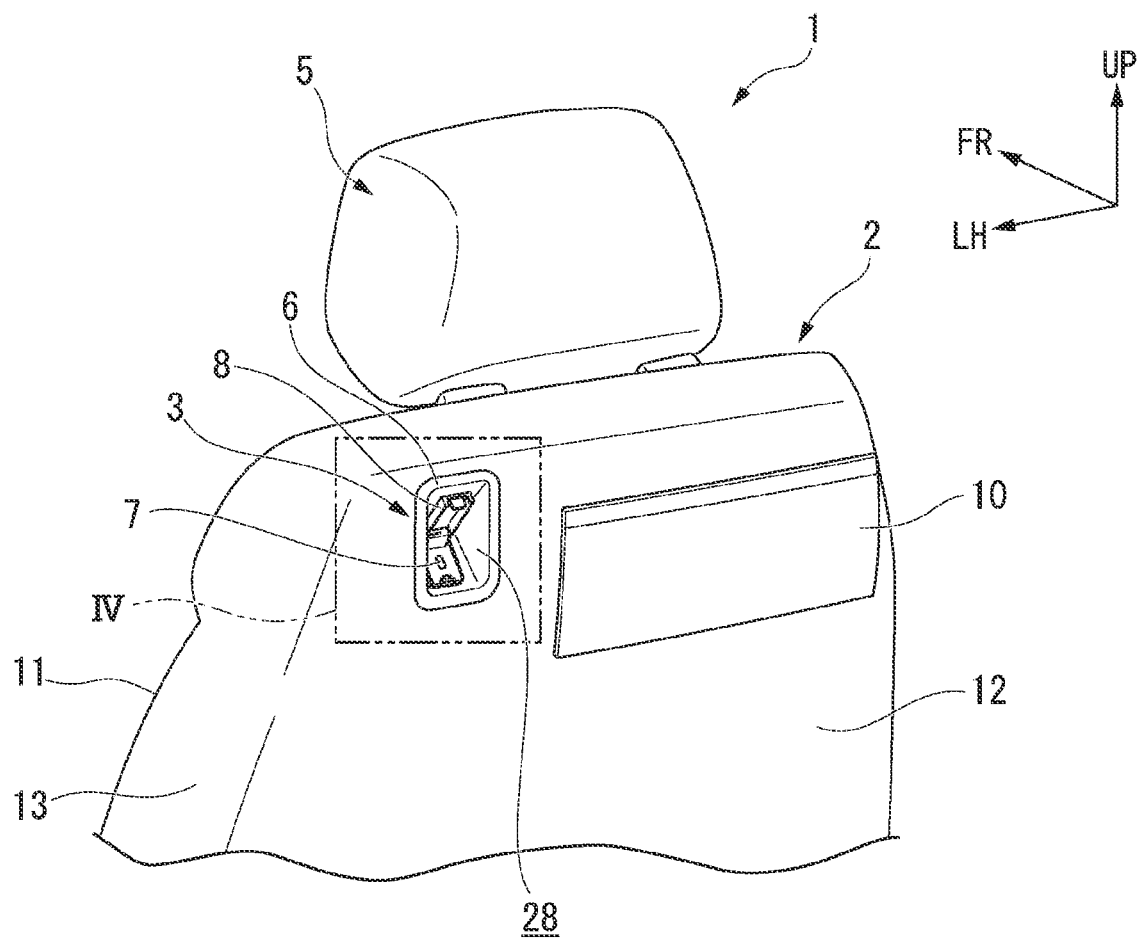
FIG. 1 is a perspective view of a vehicle seat according to an embodiment.

An embodiment of the present invention will be described below with reference to the drawings. In the following description, forward and rearward, left and right, and upward and downward directions coincide with forward and rearward, left and right, and upward and downward directions in a vehicle (not shown) to which a vehicle seat 1 is attached. A left to right direction may be referred to as a vehicle width direction. In the drawings, an arrow FR indicates a front side of a vehicle body, an arrow UP indicates an upper side of the vehicle body, and an arrow LH indicates a left side of the vehicle body.

(Vehicle Seat)

Figure 2:
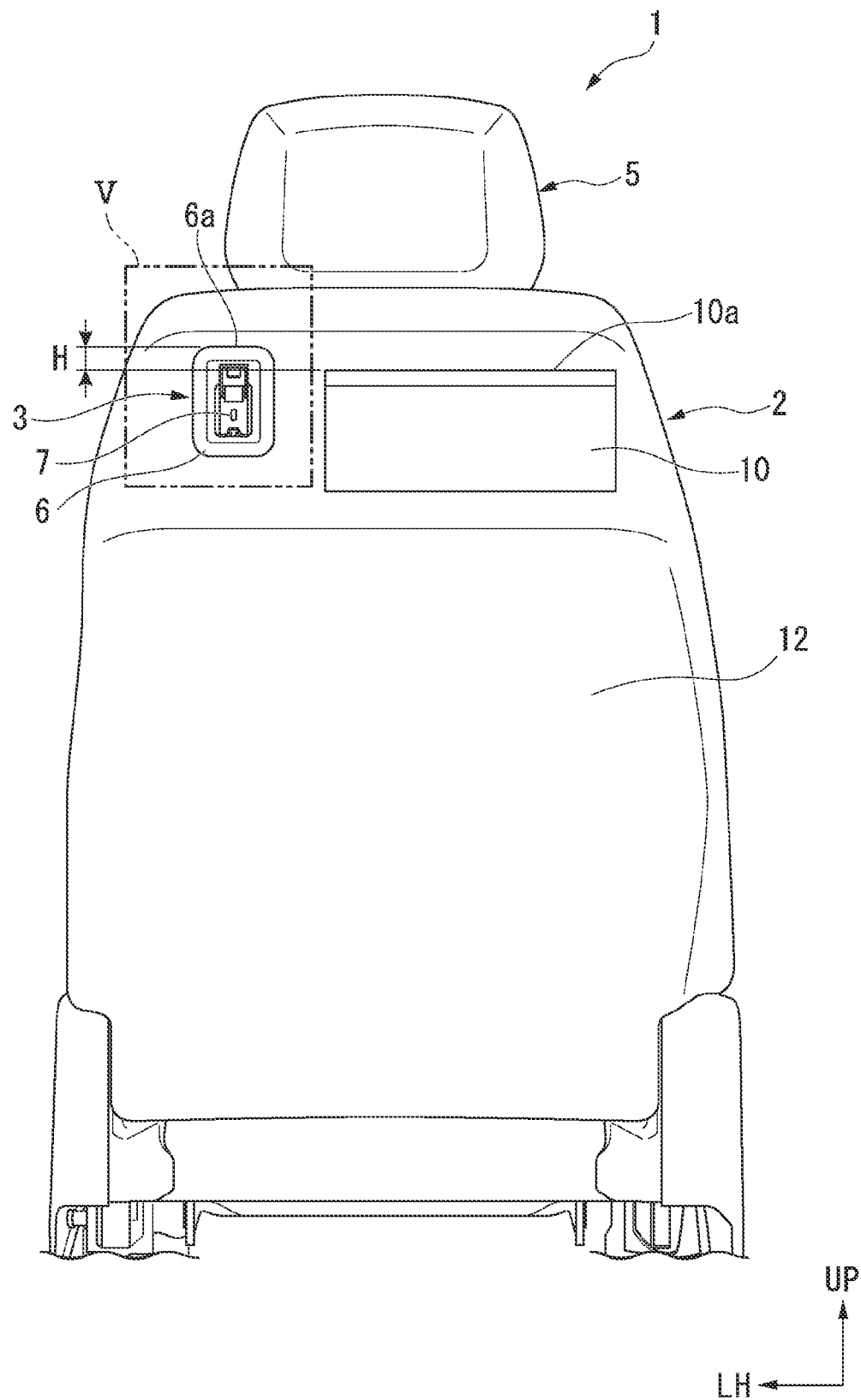
FIG. 2 is a rear view of a seat back according to the embodiment.

FIG. 1 is a perspective view of a vehicle seat 1 according to an embodiment from a left rear side. FIG. 2 is a rear view of a seat back according to the embodiment from behind.

The vehicle seat 1 is attached to, for example, an automobile. In the present embodiment, the vehicle seat 1 is applied as a seat for a driver's seat or a passenger seat. Also, the vehicle seat 1 may be applied as a seat other than the driver's seat and the passenger seat.

The vehicle seat 1 includes a seat cushion (not shown), a seat back 2, a headrest 5, and an external device connection device 3. The seat cushion (not shown) supports an occupant's buttocks. The seat back 2 is tiltably connected to a rear portion of the seat cushion to support the seated occupant' waist and back. The headrest 5 is attached to an upper portion of the seat back 2 and supports the seated occupant' neck and head.

(Seat Back)

In the following description, in an upright state of the seat back 2 (the state shown in FIG. 1), a surface of the seat back 2 facing forward, that is, a surface that supports a back surface of the occupant, is referred to as "support surface 11." In the upright state of the seat back 2, a surface of the seat back 2 facing backward, that is, a surface opposite to the support surface 11, is referred to as "back surface 12." In the seat back 2, a cushion material is appropriately attached to a plurality of frame members (a seat frame 16 and a suspension frame 18) (see FIG. 3), and an outer side of the cushion material is covered with a skin 13.

A storage pocket 10 in which articles can be stored is attached to a right shoulder portion of the back surface 12 of the seat back 2. The storage pocket 10 has an opening that opens upward. Accordingly, the storage pocket 10 can be used by putting in and taking out articles from above. The external device connection device 3, which will be described in detail later, is attached to a left shoulder portion of the back surface 12 of the seat back 2.

Figure 3:
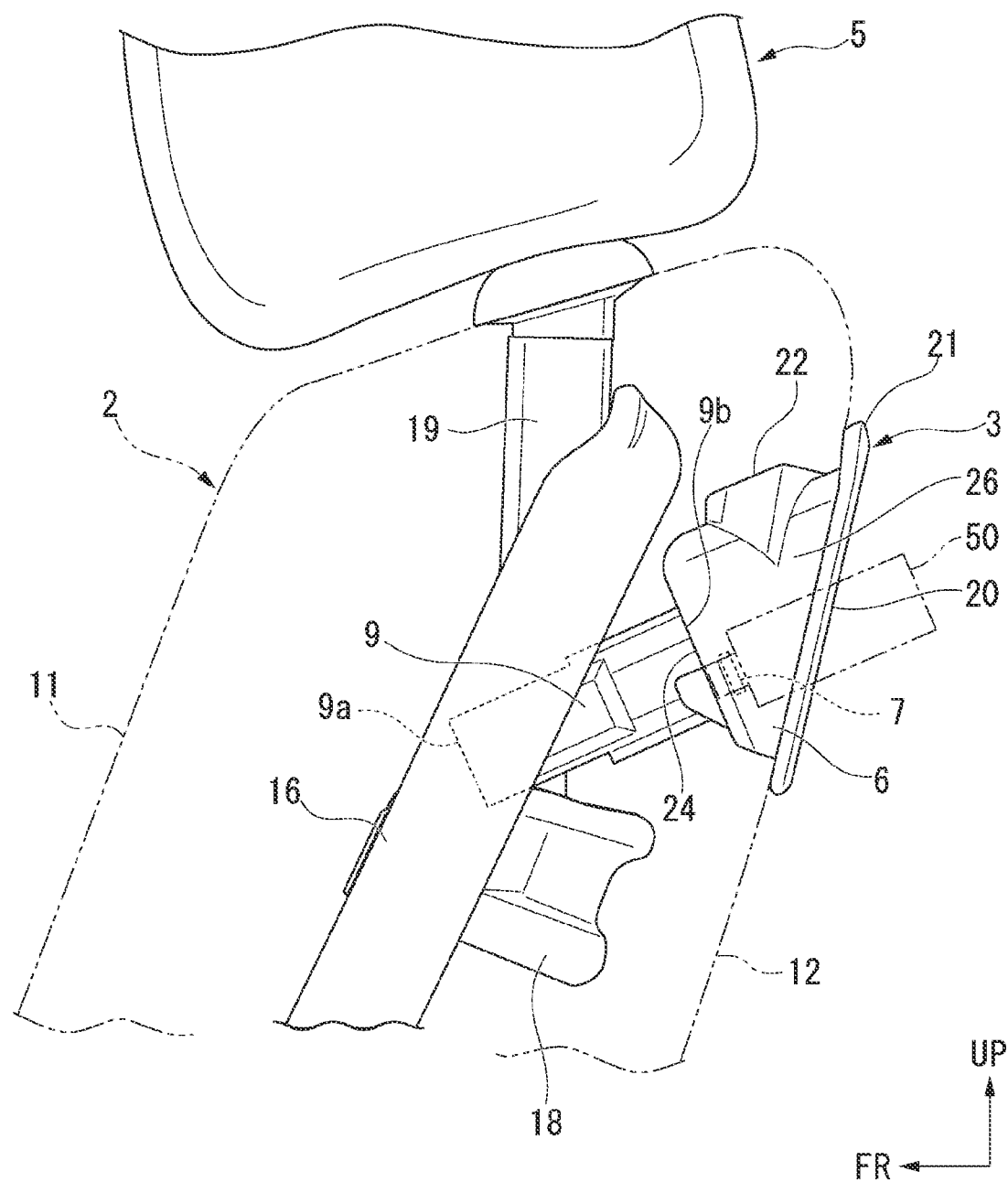
FIG. 3 is a side view of the seat back according to the embodiment.

FIG. 3 is a side view of the seat back 2 according to the embodiment in the vehicle width direction. In FIG. 3, a cushion material of the seat back 2 is not shown.

As shown in FIG. 3, the seat frame 16 and the suspension frame 18 are provided inside the seat back 2. The seat frame 16 is configured of an iron pipe member. The seat frame 16 is bent in a U-shape that is convex upward along an outer shape of the upper portion of the seat back 2 when viewed from behind. The seat frame 16 is inclined to be located further forward toward its lower side when viewed in the vehicle width direction.

The suspension frame 18 is configured of an iron plate member. The suspension frame 18 extends in the vehicle width direction. The suspension frame 18 is a press-molded member having a front to rear direction as a thickness direction and an uneven shape in the front to rear direction in a cross-sectional view orthogonal to the extending direction. The suspension frame 18 is suspended between both end portions of the seat frame 16. The seat frame 16 and the suspension frame 18 are joined to each other by welding, for example. The suspension frame 18 is curved to be located further rearward toward a central portion thereof in the vehicle width direction from both end portion thereof connected to the seat frame 16 when viewed in a vertical direction.

As shown in FIGS. 1 and 3, the headrest 5 is attached to the upper portion of the seat back 2. The headrest 5 has a pair of left and right head stays 19. The head stays 19 extend from the headrest 5 toward the seat back 2. The headrest 5 is attached to the seat back 2 by inserting the head stays 19 into the seat back 2. The seat frame 16 and the suspension frame 18 of the seat back 2 are provided with a headrest bracket (not shown) for supporting the head stays 19. As shown in FIG. 3, the head stays 19 are located in front of the seat frame 16 and the suspension frame 18 in a state in which the headrest 5 has been attached to the seat back 2.

The pair of head stays 19 are provided inward in the vehicle width direction from both end portions of the seat frame 16 in the vehicle width direction. Accordingly, the left head stay 19, a left end portion of the seat frame 16, and the suspension frame 18 form a truss-like structure surrounded by the head stays 19 and the frames 16 and 18 when viewed from behind. Similarly, the right head stay 19, a right end portion of the seat frame 16, and the suspension frame 18 form a truss-like structure surrounded by the headstays 19 and the respective frames 16 and 18 when viewed from behind.

(External Device Connection Device)

Figure 4:
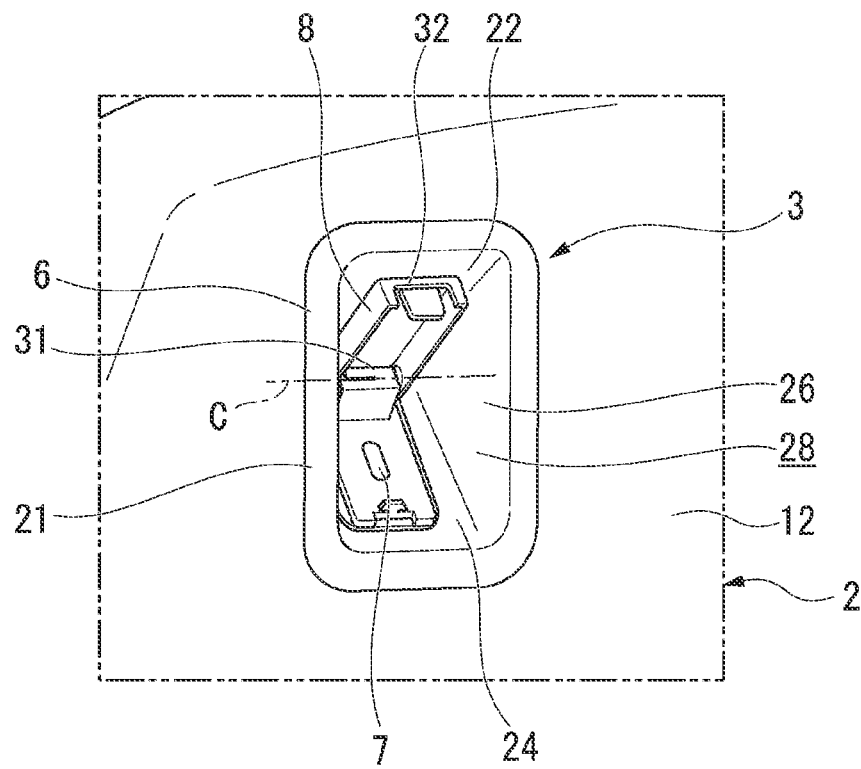
FIG. 4 is an enlarged view of section IV in FIG. 1.
Figure 5:
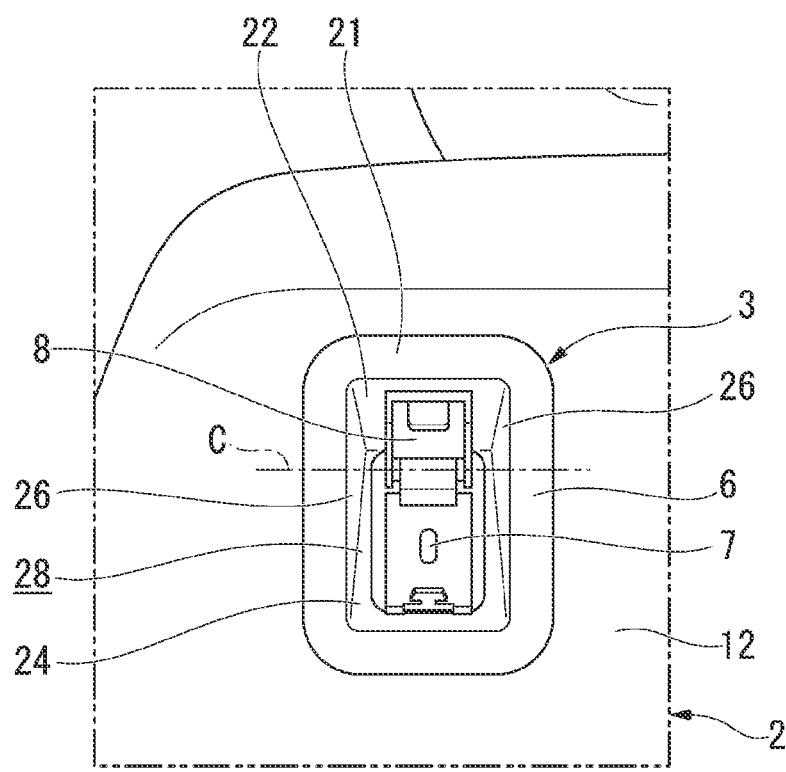
FIG. 5 is an enlarged view of section V in FIG. 2.

FIG. 4 is an enlarged view of section IV in FIG. 1. FIG. 5 is an enlarged view of section V in FIG. 2.

As shown in FIGS. 4 and 5, the external device connection device 3 is provided on the seat back 2. The external device connection device 3 can be used by connecting an electronic device carried by, for example, an occupant sitting on the vehicle seat 1 or an occupant seated on a rear seat located behind the vehicle seat 1. The external device connection device 3 of the present embodiment can be connected to, for example, a USB 50 from the back surface 12 side of the seat back 2. In other words, in the present embodiment, an external device is the USB 50. The external device connection device 3 includes a socket housing 6, a socket 7, a socket cover 8, and a booster unit 9 (see FIG. 3).

The socket housing 6 is provided on the back surface 12 of the seat back 2. The socket housing 6 is formed to be recessed from the back surface 12 of the seat back 2 toward the inside (a front side) of the seat back 2. The socket housing 6 is made of a material such as a resin. The socket housing 6 is attached to the skin 13 of the seat back 2. The socket housing 6 has a frame portion 21, an upper inclined surface 22, a lower inclined surface 24, and a pair of side surfaces 26 and 26.

The frame portion 21 is attached to the skin 13 of the back surface 12 of the seat back 2. The skin 13 is provided with an opening (not shown), and the frame portion 21 is attached to an edge portion of the opening. The frame portion 21 is formed in a rectangular frame shape when viewed from behind. As shown in FIG. 3, an inner region (a flat surface) of the frame portion 21 serves as an opening surface 20 of the socket housing 6.

As shown in FIGS. 3 and 4, the upper inclined surface 22 is located further inside the seat back 2 with respect to the back surface 12 of the seat back 2. The upper inclined surface 22 extends from an upper side of the frame portion 21 toward the inside of the seat back 2. The upper inclined surface 22 is formed in a rectangular plate shape. The upper inclined surface 22 is inclined to be located further downward toward the inside of the seat back 2 from the frame portion 21 (the back surface 12 of the seat back 2).

The lower inclined surface 24 is located further inside the seat back 2 with respect to the back surface 12 of the seat back 2. The lower inclined surface 24 is provided below the upper inclined surface 22. The lower inclined surface 24 extends from a lower side of the frame portion 21 toward the inside of the seat back 2. The lower inclined surface 24 is formed in a rectangular plate shape. The lower inclined surface 24 is inclined to be located further upward toward the inside of the seat back 2 from the frame portion 21. A front end portion of the upper inclined surface 22 and a front end portion of the lower inclined surface 24 are connected to each other.

The pair of side surfaces 26 extend respectively from a left side and a right side of the frame portion 21 toward the inside of the seat back 2. The pair of side surfaces 26 are provided between the upper inclined surface 22 and the lower inclined surface 24. The pair of side surfaces 26 are formed in triangular plate shapes. An upper end portion of the left side surface 26 is connected to a left end portion of the upper inclined surface 22 in the vehicle width direction. A lower end portion of the left side surface 26 is connected to a left end portion of the lower inclined surface 24 in the vehicle width direction. An upper end portion of the right side surface 26 is connected to a right end portion of the upper inclined surface 22 in the vehicle width direction. A lower end portion of the right side surface 26 is connected to a right end portion of the lower inclined surface 24 in the vehicle width direction. The pair of side surfaces 26 are provided substantially parallel to a plane orthogonal to the vehicle width direction.

The socket housing 6 has a recessed portion 28 formed by the upper inclined surface 22, the lower inclined surface 24, and the pair of side surfaces 26, which is recessed from the back surface 12 of the seat back 2 toward the inside of the seat back 2. In other words, a space inside the socket housing 6 is the recessed portion 28. As shown in FIG. 3, the opening surface 20 of the recessed portion 28 located behind the socket housing 6 is substantially flush with the back surface 12 of the seat back 2.

As shown in FIGS. 4 and 5, the socket 7 is provided to face the back surface 12 of the seat back 2 in an inclined direction. In the present embodiment, the socket 7 is provided on the lower inclined surface 24. That is, the socket 7 is provided on the surface inclined to face upward with respect to the back surface 12. The socket 7 is an insertion port to which the USB 50 can be connected from the back surface 12 of the seat back 2. The socket 7 is surrounded by the socket housing 6. The socket 7 is provided inside the recessed portion 28. An end portion of the socket 7 on the back surface 12 side is located further inside the seat back 2 with respect to the opening surface 20 of the socket housing 6. As shown in FIG. 3, a USB can be inserted into the socket 7 from a direction substantially perpendicular to the lower inclined surface 24. Accordingly, the USB connected to the socket 7 protrudes obliquely upward and backward with respect to the back surface 12 of the seat back 2.

As shown in FIG. 2, the storage pocket 10 provided on the back surface 12 and the recessed portion 28 of the socket housing 6 are provided at positions at which they partially overlap each other in the vertical direction. An upper end portion 6a of the recessed portion 28 of the socket housing 6 is located a height H above an upper end portion 10a of the storage pocket 10.

As shown in FIGS. 4 and 5, the socket cover 8 is provided inside the recessed portion 28. The socket cover 8 covers the socket 7 when the socket 7 is not in use. The socket cover 8 is made of a resin-based material. The socket cover 8 is attached to the lower inclined surface 24 of the socket housing 6 to be rotatable about a rotation axis C formed in the vehicle width direction. The socket cover 8 rotates about the rotation axis C serving as a rotation center between a closed state in which the socket cover 8 is substantially parallel to the lower inclined surface 24 and covers the socket 7 and an open state in which the socket 7 is exposed. A first end portion 31 (a front end portion) of the socket cover 8 on which the rotation axis C is provided is provided further inside the seat back with respect to a second end portion 32 (a rear end portion) located on a side opposite to the rotation axis C. In the open state, the socket cover 8 has the second end portion 32 that has rotated upward with the first end portion 31 as a fulcrum. When the socket 7 is used, the USB 50 can be inserted by opening the socket cover 8 to expose the socket 7.

The rearmost second end portion 32 of the socket cover 8 is located further inside the seat back 2 (in front of the opening surface 20) with respect to the opening surface 20 of the recessed portion 28 in any state from the closed state to the open state of the socket cover 8. That is, regardless of the open or closed state of the socket cover 8, the entire socket cover 8 is always housed inside the recessed portion 28.

As shown in FIG. 3, the booster unit 9 is connected to the socket 7 and extends from the socket 7 toward the inside of the seat back 2. The booster unit 9 is provided between the socket 7 and a power supply (not shown) of the vehicle body. The booster unit 9 boosts a voltage from the power supply of the vehicle body and supplies a current to the USB 50 (electronic device) connected to the socket 7.

The booster unit 9 is housed inside the seat back 2. Specifically, the booster unit 9 is provided from a shoulder portion to a body portion of the seat back 2 on the back surface 12 side. The body portion of the seat back 2 is, for example, a portion corresponding to a torso of an occupant sitting on the vehicle seat 1. A rear end portion 9b of the booster unit 9 is attached to the socket housing 6. The rear end portion 9b of the booster unit 9 is attached to the lower inclined surface 24 of the socket housing 6. The booster unit 9 extends from a front surface of the lower inclined surface 24 in a direction substantially orthogonal to the lower inclined surface 24. A cushion material is disposed between the socket housing 6 and the seat frame 16, and the booster unit 9 penetrates the cushion material to be disposed on the inner side of the seat back 2. The booster unit 9 is obliquely disposed to be located further downward toward the support surface 11 (front side) from the back surface 12.

At least a part of the booster unit 9 is provided at a position overlapping the seat frame 16 in a side view of the seat back 2 and at a position on the back surface 12 side of the seat back 2 with respect to the seat frame 16. In the present embodiment, a front end portion 9a of the booster unit 9 is located behind the seat frame 16 (on the back surface 12 side) in a side view. In other words, the booster unit 9 is disposed not to protrude forward from the seat frame 16.

Further, the booster unit 9 is provided in a region surrounded in a truss shape by the seat frame 16, the head stays 19, and the suspension frame 18 when viewed from behind. In the present embodiment, the entire booster unit 9 is provided in a region surrounded by the left end portion of the seat frame 16, the left head stay 19, and the suspension frame 18 when viewed from behind.

(Functions and Effects)

Next, functions and effects of the above-mentioned vehicle seat 1 will be described.

According to the vehicle seat 1 of the present embodiment, the back surface 12 of the seat back 2 is provided with the recessed portion 28 that is recessed toward the inside of the seat back 2. The socket 7 is provided inside the recessed portion 28. By connecting an external device (the USB 50) to the socket 7, the occupant on the rear seat can appropriately use an electronic device or the like.

Figure 6:
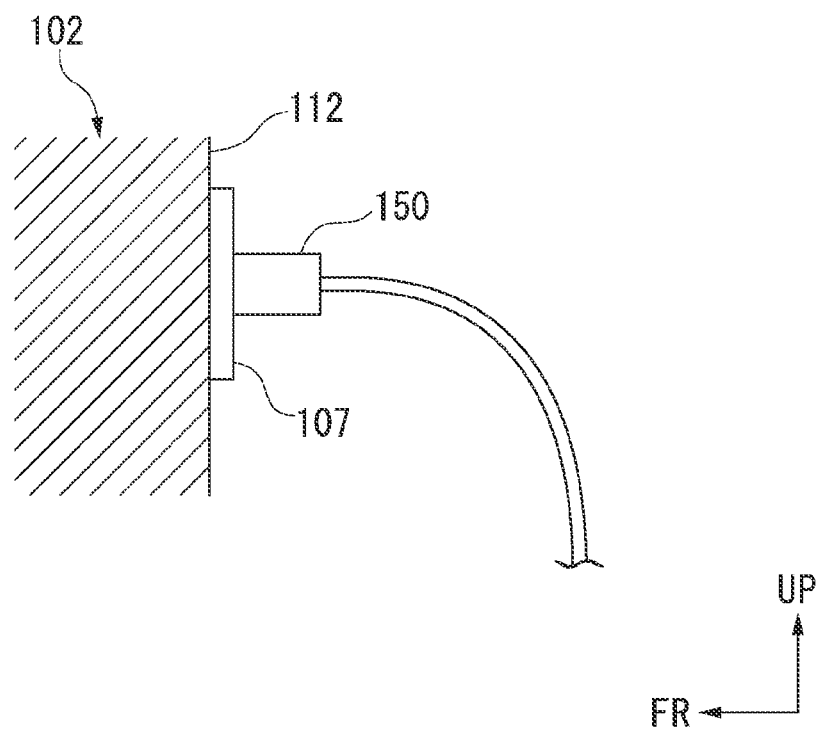
FIG. 6 is a side view of a seat back according to a conventional technique.

FIG. 6 is a side view of a seat back 102 according to a conventional technique.

As shown in FIG. 6, in a conventional technique in which a socket 107 is provided to face rearward on a surface parallel to a back surface 112 of the seat back 102, a USB 150 attached to the socket 107 extends substantially vertically and rearward from the back surface 112. For this reason, an amount of protrusion of the USB 150 from the back surface 112 increases, and thus there is a risk of interfering with an occupant sitting on a rear seat.

On the other hand, according to the vehicle seat 1 of the present embodiment, the socket 7 is provided to face the back surface 12 of the seat back 2 in the inclined direction. For this reason, in a case in which the occupant on the rear seat connects the USB 50 to the socket 7, the USB 50 protrudes obliquely with respect to the back surface 12 of the seat back 2. Thus, the amount of rearward protrusion of the USB 50 can be reduced as compared with the conventional technique in which the USB 50 is connected substantially perpendicular to the back surface 12. Accordingly, when the USB 50 is connected to the socket 7, it becoming an obstacle to the occupant sitting on the rear seat can be inhibited and a large space behind the seat back 2 can be secured. Accordingly, convenience and comfort for the occupant sitting on the rear seat can be improved.

Since the socket 7 is provided inside the recessed portion 28, the amount of protrusion of the USB 50 can be reduced as compared with the case in which the socket 7 is provided to protrude from the back surface 12 or is provided to be flush with the back surface 12. Further, since the socket 7 is provided inside the recessed portion 28, it is easier to protect the socket 7 from an external impact or the like as compared with the case in which the socket 7 is provided to protrude from the back surface 12. Thus, for example, even in a case in which the seat back 2 comes into contact with the rear seat or the like during reclining, it is possible to inhibit the socket 7 from directly abutting the rear seat or the like. Accordingly, the socket 7 can be reliably protected. Similarly, since a part of the USB 50 connected to the socket 7 is also housed in the recessed portion 28, a cable connected to the USB 50, a connection port, and the like can be protected, for example. Further, during reclining, the socket 7 and the USB 50 connected to the socket 7 are less likely to come into contact with the occupant on the rear seat, or the like. Accordingly, the comfort for the occupant on the rear seat can be improved.

Therefore, it is possible to provide the vehicle seat 1 that can improve the convenience and comfort with regard to the socket 7 for the occupant who uses the socket 7.

The socket 7 is provided on the surface inclined to face upward with respect to the back surface 12. Thus, when the USB 50 is connected to the socket 7, the USB 50 protrudes obliquely upward with respect to the back surface 12 of the seat back 2. Accordingly, it is possible to reduce the amount of protrusion of the USB 50 from the back surface 12 and make the arrangement convenient for the occupant sitting directly behind the seat back 2.

The vehicle seat 1 has the rotatable socket cover 8. Accordingly, for example, the socket 7 can be suitably protected by closing the socket cover 8 when the socket 7 is not in use. The rotation axis C of the socket cover 8 is provided further inside the seat back 2 with respect to the second end portion 32. Thus, the socket cover 8 can be opened and closed rearward (operable from a rear side) around the rotation axis C serving as the center. Accordingly, it is possible to form the socket cover 8 convenient for the occupant on the rear seat located behind the seat back 2.

The socket cover 8 is provided inside the recessed portion 28 and is located further inside the seat back 2 with respect to the opening surface 20 of the recessed portion 28. Thus, for example, even in the case in which the seat back 2 comes into contact with the rear seat or the like during reclining, it is possible to inhibit the socket cover 8 from directly abutting the rear seat or the like. In particular, the first end portion 31 of the socket cover 8 is located further inside the seat back 2 with respect to the second end portion 32, and thus even in the state in which the socket cover 8 fully opens, the second end portion 32 is located further inside the seat back 2 with respect to the opening surface 20. As a result, it is possible to reliably protect the socket cover 8 when the occupant moves behind the vehicle seat 1 or when reclining The storage pocket 10 is provided on the back surface 12 of the seat back 2. The socket 7 is provided to face upward with respect to the back surface 12. The storage pocket 10 and the recessed portion 28 are provided at the positions at which they partially overlap each other in the vertical direction, and the upper end portion 6a of the recessed portion 28 is located above the upper end portion 10a of the storage pocket 10. By disposing them in this way, for example, it becomes easy to house an electronic device or the like connected to the socket 7 via the USB 50 in the storage pocket 10 in the state in which the USB 50 has been connected to the socket 7. Accordingly, it is possible to make a highly convenient arrangement in consideration of the situation when the occupant uses the socket 7.

The socket housing 6 is formed to be recessed from the back surface 12 of the seat back 2 to the inside of the seat back 2 and is attached to the skin 13 of the seat back 2 to surround the socket 7. The space inside the socket housing 6 is the recessed portion 28. Accordingly, by providing the socket housing 6, the recessed portion 28 can be appropriately provided on the back surface 12 of the seat back 2 with a simple configuration. Since the socket 7 is surrounded by the socket housing 6, the socket 7 can be protected by the socket housing 6. The socket housing 6 is attached to the skin 13 of the seat back 2, and thus even in the case in which the seat back 2 comes into contact with the rear seat or the like during reclining, it is possible to release an impact to the entire seat via the socket housing 6. As a result, the socket housing 6 and the socket 7 can be protected from the impact.

Also, the technical scope of the present invention is not limited to the above-described embodiment, and various changes can be made without departing from the spirit of the present invention.

For example, in the above-described embodiment, the configuration in which the socket 7 is provided on the surface (lower inclined surface 24) inclined to face upward with respect to the back surface 12 has been described, but the present invention is not limited thereto. The socket 7 may be provided on a surface inclined to face obliquely with respect to the back surface 12, for example, provided on a surface inclined to face downward, a right side, or a left side with respect to the back surface 12. In a case in which the socket 7 is provided on the surface inclined to face downward (for example, the upper inclined surface 22 of the present embodiment), the upper end portion of the storage pocket 10 is preferably provided below the socket 7 in order to facilitate storage of an electronic device connected to the socket 7. Similarly, in a case in which the socket 7 is provided on the surface inclined to face the right side, the storage pocket 10 is preferably provided on the right side of the socket 7. In a case in which the socket 7 is provided on the surface inclined to face the left side, the storage pocket 10 is preferably provided on the left side of the socket 7.

The storage pocket 10 may be provided on the left shoulder portion and the external device connection device may be provided on the right shoulder portion. In addition to the storage pocket 10, the seat back 2 may separately have a rotatable simple table, a table on which an electronic device is installed, or the like.

In the above embodiment, the USB 50 has been described as an example of the external device connected to the socket, but the external device connected to the socket is not limited to the USB 50.

The socket cover 8 may not be provided. According to the present embodiment, the socket 7 is surrounded by the housing and is disposed further inside the seat back 2 with respect to the opening surface 20. For this reason, even in a case in which the socket cover 8 is not provided, the socket 7 can be protected from an impact resulting from contact with the rear seat. However, the configuration of the present embodiment having the socket cover 8 is advantageous in that the socket 7 can be protected more safely.

In addition, the components in the above-described embodiment can be appropriately replaced with well-known components without departing from the spirit of the present invention, and the above-mentioned embodiments may be combined as appropriate.

REFERENCE SIGNS LIST

1 Vehicle seat
2 Seat back
6 Socket housing
6a Upper end portion (of recessed portion)
7 Socket
8 Socket cover
10 Storage pocket
10a Upper end portion (of storage pocket)
11 Support surface
12 Back surface
13 Skin 20 Opening surface
22 Upper inclined surface (surface inclined to face downward)
24 Lower inclined surface (surface inclined to face upward)
28 Recessed portion
31 First end portion
32 Second end portion
50 USB (external device)
C Rotation axis

What is claimed is:

1. A vehicle seat comprising:
    a seat back including a support surface that supports an occupant's back;
    a recessed portion that is provided on a back surface of the seat back opposite to the support surface and formed to be recessed from the back surface toward the inside of the seat back;
    a socket provided inside the recessed portion, to which an external device is connected, and which is provided to face the back surface of the seat back in an inclined direction; and
    a socket cover that rotates around a rotation axis between a closed state in which the socket is covered and an open state in which the socket is exposed,
    wherein a first end portion of the socket cover on which the rotation axis is provided is provided further inside the seat back with respect to a second end portion located on a side opposite to the rotation axis, and
    the socket cover is provided inside the recessed portion and located further inside the seat back with respect to an opening surface of the recessed portion regardless of the open or closed state of the socket cover.

2. The vehicle seat according to claim 1, wherein the socket is provided on a surface inclined to face either upward or downward with respect to the back surface.

3. The vehicle seat according to claim 1, further comprising a storage pocket provided on the back surface of the seat back,
    wherein the socket is provided on a surface inclined to face upward with respect to the back surface,
    the storage pocket and the recessed portion are provided at positions at which they partially overlap each other in a vertical direction, and
    an upper end portion of the recessed portion is located above an upper end portion of the storage pocket.

4. The vehicle seat according to claim 1, further comprising a socket housing which is formed to be recessed from the back surface of the seat back to the inside of the seat back and which is attached to a skin of the seat back to surround the socket,
    wherein a space inside the socket housing is the recessed portion.

* * * * *